US007777439B2

(12) United States Patent
Falkenstein

(10) Patent No.: US 7,777,439 B2
(45) Date of Patent: Aug. 17, 2010

(54) METHOD AND DEVICE FOR DETERMINING A GRADIENT-LIMITED CUMULATIVE SETPOINT TORQUE FROM A SETPOINT TORQUE OF A CLOSED-LOOP SPEED CONTROL

(75) Inventor: Jens-Werner Falkenstein, Aalen (DE)

(73) Assignee: Robert Bosch GmbH, Stuttgart (DE)

( * ) Notice: Subject to any disclaimer, the term of this patent is extended or adjusted under 35 U.S.C. 154(b) by 363 days.

(21) Appl. No.: 12/072,383

(22) Filed: Feb. 25, 2008

(65) Prior Publication Data

US 2009/0033264 A1 Feb. 5, 2009

(30) Foreign Application Priority Data

Feb. 28, 2007 (DE) ....................... 10 2007 009 688

(51) Int. Cl.
*H02P 7/00* (2006.01)

(52) U.S. Cl. ........................ 318/432; 318/434; 318/456

(58) Field of Classification Search ................. 318/139, 318/430–434, 456, 461
See application file for complete search history.

(56) References Cited

U.S. PATENT DOCUMENTS 3,899,725 A * 8/1975 Plunkett ..................... 318/802
4,284,936 A * 8/1981 Bailey et al. ................ 318/381
5,864,218 A * 1/1999 Orthmann ................... 318/701
6,194,850 B1 * 2/2001 Kumar et al. ................. 318/52

* cited by examiner

*Primary Examiner*—Bentsu Ro
(74) *Attorney, Agent, or Firm*—Kenyon & Kenyon LLP

(57) ABSTRACT

In a method for determining a gradient-limited setpoint torque from a requested setpoint drive torque and a controller setpoint torque of a closed-loop speed control, the gradient of an unlimited cumulative setpoint torque, which is a function of the requested setpoint drive torque and the controller setpoint torque of the closed-loop speed control, is limited in a region of the zero crossing of the gradient-limited setpoint torque by a rate-of-change limitation to a maximally permitted or a minimally permitted value. The maximally permitted or the minimally permitted value of the rate-of-change limitation is a function of the controller setpoint torque of the closed-loop speed control.

10 Claims, 5 Drawing Sheets

METHOD AND DEVICE FOR DETERMINING A GRADIENT-LIMITED CUMULATIVE SETPOINT TORQUE FROM A SETPOINT TORQUE OF A CLOSED-LOOP SPEED CONTROL

BACKGROUND OF THE INVENTION

1. Field of the Invention

The present invention relates to a method and a device for forming a setpoint torque of a drive motor, in particular in connection with an operating mode of the drive motor having closed-loop speed control.

2. Description of Related Art

Rapid load changes or gear-change operations in motor vehicles can cause jerking, which is annoying to the driver and has a detrimental effect on the driving comfort. Known methods for reducing judder vibrations are based on avoiding an excitation of the drive train due to rapid load changes. In rapid variations, the setpoint drive torque requested by the driver via the drive pedal (or by driver-assistance systems) is therefore low-pass filtered with the aid of reference-forming elements, and/or its rate of change is restricted. This causes a delay in the torque generation and reduction.

In addition, measures are taken in zero crossings of the drive torque, i.e., in the transition from overrun operation to acceleration operation. The related zero crossing of the reaction torque causes tilting of the engine transmission in the bearings. This transition should be "soft" for reasons of comfort, which is achieved by limiting the rate-of-change of the setpoint drive torque during the passage through zero. As a rule, both measures are implemented, the rate-of-change limitation being applied after the requested setpoint drive torque has been low-pass-filtered.

The interaction becomes problematic with an additional speed controller or idle controller which specifies a controller setpoint torque that is to prevent such things as, for example, chocking of a combustion engine used as drive motor. In order to ensure a response of the vehicle even to a slight actuation of the driving pedal, the controller setpoint torque is cumulatively incorporated in the requested setpoint drive torque.

Adding the controller setpoint torque to the setpoint drive torque (prior to the filtering and rate-of-change limitation) would be advantageous from the viewpoint of the reference formation, since the cumulative setpoint torque resulting at the output of the rate-of-change limitation would then have an appropriate form. However, an influencing of the controller setpoint torque by the following reference formation is not practicable from the viewpoint of the closed-loop speed control. For one, the low-pass filtering delays controller setpoint torque, which causes a delay in a compensation torque induced by the closed-loop speed control, so that, for instance, choking of the combustion engine becomes more likely. For another, the behavior of the controlled system varies considerably due to the non-linearity in the rate-of-change limitation, which requires a very robust controller and thus has a considerable adverse effect on the quality of the closed loop control.

From the viewpoint of the closed loop speed control, it is advantageous to include the controller setpoint torque in the signal flow following the reference formation. The controller setpoint torque is then added to the setpoint torque limited by the rate-of-change limitation, so that the controller is thus able to intervene directly in the cumulative setpoint torque resulting from the addition. The controller setpoint torque must then additionally be taken into account in the rate-of-change limitation, since it is the zero crossing of the cumulative setpoint torque that is to be formed and not the zero crossing of the setpoint torque limited by the rate-of-change limitation. Furthermore, there are problems in the transitions between rpm-regulated operation close to idling speed and torque-controlled operation above idling speed due to the fact that the gradient of the controller setpoint torque has an additional effect on the gradient of the cumulative setpoint torque.

Without actuation of the driving pedal by the driver, a negative setpoint drive torque results so as to enable overrun operation of the drive. At higher speeds, the controller is not active and the controller setpoint torque is zero. The combustion engine is operated using small injection quantities or is operating with deceleration fuel cutoff. If the rotational speed drops in the direction of idling speed, then the controller intervenes by a controller setpoint torque that is greater than zero and compensates the negative setpoint drive torque, and (in a frictional connection) a load torque, which is caused by running resistance (aerodynamic, rolling, climbing resistance, etc.).

When the driving pedal is actuated during the rpm-regulated operation, there is an increase in the setpoint drive torque and the (reference-formed) limited setpoint torque together with an acceleration of the vehicle. The rise of the rotational speed leads to a reduction in the controller setpoint torque. This partially compensates for the rise in the limited setpoint torque, or it may even cause undershooting in the cumulative setpoint torque. In both cases the gradient of the cumulative setpoint torque deviates from the optimally vehicle-adjusted gradient of the setpoint torque limited by the rate-of-change limitation. The acceleration no longer progresses optimally, and the achievable dynamic performance is limited. The undershooter may cause the cumulative setpoint torque to cross zero multiple times, combined with poor behavior of the drive in a load change.

BRIEF SUMMARY OF THE INVENTION

It is an object of the present invention to provide a method and a device for torque formation in a drive motor, in which comfortable load changes are achievable with high dynamic performance while considering an intervention by the closed-loop speed control in an operation having rpm-regulated control close the to idling speed, with high control quality of the closed-loop speed control.

According to a first aspect of the present invention, a method for determining a gradient-limited setpoint torque from a requested setpoint drive torque and a controller setpoint torque of a closed-loop speed control are provided. A rate-of-change limitation limits the gradient of an unlimited cumulative setpoint torque, which is a function of the requested setpoint drive torque and the setpoint torque of the closed-loop speed control, to a maximally permitted or a minimally permitted value in a region of the zero crossing of the gradient-limited setpoint torque, the maximally permitted or the minimally permitted value of the rate-of-change limitation being a function of the controller setpoint torque of the closed-loop speed control.

The core of the present invention is to determine a combined, unlimited cumulative setpoint torque from the controller setpoint torque of a closed-loop speed control, and from a setpoint drive torque of additional requesters (driver, driver-assistance systems, etc.), and to implement a rate-of-change limitation of this unlimited cumulative setpoint torque. In so doing, the controller setpoint torque of the closed-loop speed control and/or its gradient influences at least one limit of the rate-of-change limitation, i.e., the upper and/or the lower limit, for the unlimited cumulative setpoint torque. This achieves high driving comfort while providing high control quality at the same time.

Furthermore, the unlimited cumulative setpoint torque may correspond to the sum of the setpoint drive torque and the controller setpoint torque of the closed-loop speed control.

According to one example embodiment, the maximally permitted or the minimally permitted value of the rate-of-change limitation is determined from the limited setpoint torque and a differential value, the differential value being determined in the specified manner as a function of the limited setpoint torque, in particular by a rule or a characteristic map.

Furthermore, the determination of the maximally permitted or the minimally permitted value of the rate-of-change limitation may be implemented cyclically or at specified time intervals, the maximally permitted or the minimally permitted value of the rate-of-change limitation resulting from the limited setpoint torque directly determined in the preceding cycle, and the differential value as a function of the limited setpoint torque directly determined in the preceding cycle.

In addition, if the amount of the gradient of the controller setpoint torque or the difference between the instantaneous controller setpoint torque and the controller setpoint torque determined in the preceding cycle is greater than the amount of the differential value, then the maximally permitted or the minimally permitted value of the rate-of-change limitation is set as a function of a gradient of the controller setpoint torque or a difference between the instantaneous controller setpoint torque and the controller setpoint torque determined in the preceding cycle.

The requested setpoint drive torque is preferably low-pass filtered before the unlimited cumulative setpoint torque is determined.

At least one filter parameter of the filtering may be adapted in such a way that the result of the filtering corresponds to the difference between the limited setpoint torque and the controller setpoint torque.

As an alternative or in addition, at least one parameter of the closed-loop speed control may be adapted in such a way that the controller setpoint torque corresponds to the difference between the limited setpoint torque and the filtered setpoint drive torque.

The closed-loop speed control is able to be activated as a function of a rotational speed of a drive motor.

According to an additional aspect of the present invention, a device for determining a gradient-limited setpoint torque from a requested setpoint drive torque and a controller setpoint torque of a closed-loop speed control is provided. The device includes a speed governor for providing a controller setpoint torque, a rate-of-change limiter for limiting the gradient of an unlimited cumulative setpoint torque, which is a function of the requested setpoint drive torque and the controller setpoint torque, in a region of the zero crossing of the gradient-limited setpoint torque to a maximally permitted and/or a minimally permitted value, and it includes a calculation unit for supplying the maximally permitted and/or the minimally permitted value of the rate-of-change limitation as a function of the controller setpoint torque.

DETAILED DESCRIPTION OF THE INVENTION

Figure 1:
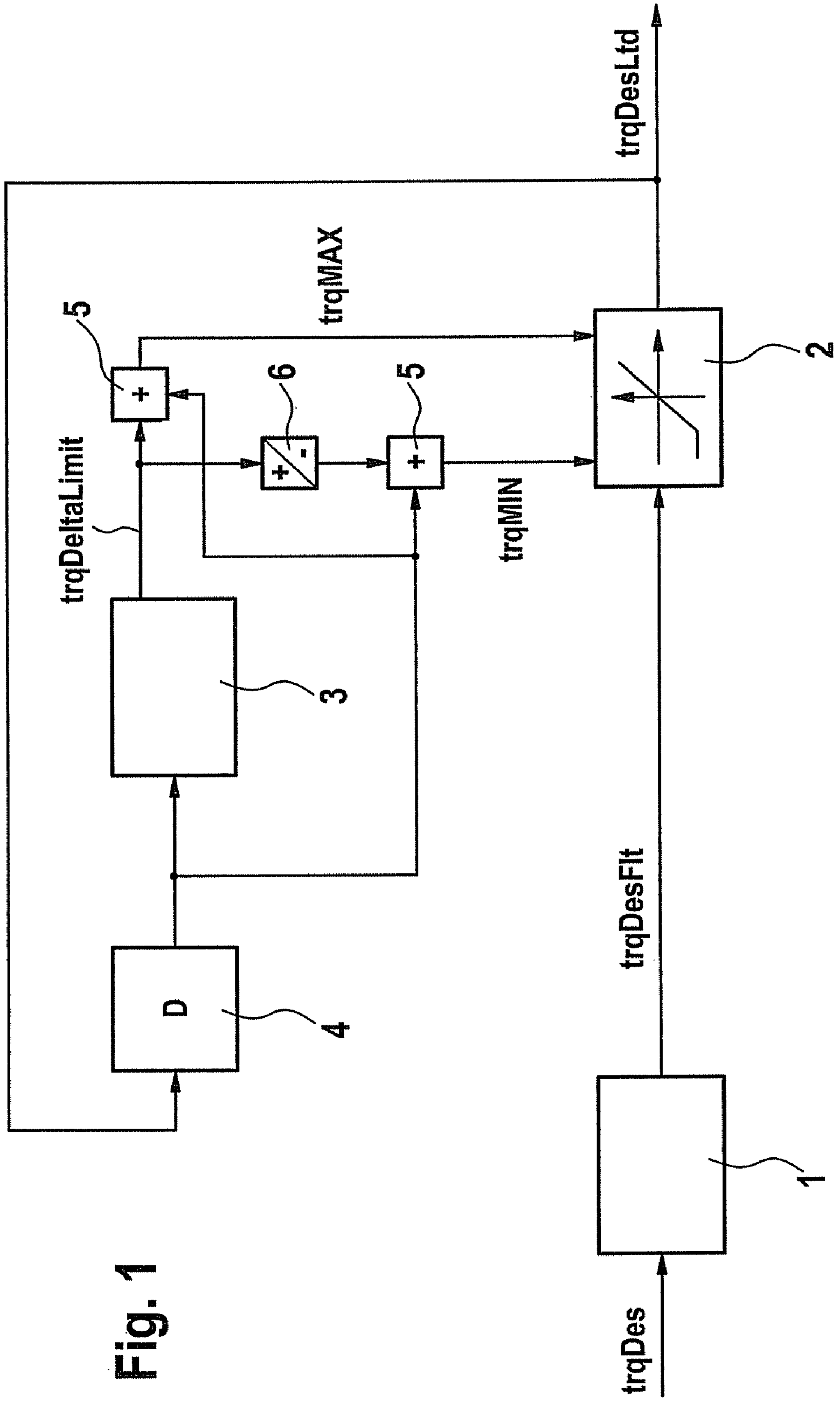
FIG. 1 shows a block diagram illustrating the method for realizing a torque formation according to the related art.

One possible realization of torque formation is shown in FIG. 1. A setpoint drive torque trqDes requested by, for instance, a driver (via the gas pedal position) or requested by other vehicle devices is forwarded to a filter stage 1 where it is low-pass-filtered. Filtered setpoint drive torque trqDesFlt obtained in this manner is then forwarded to a rate-of-change limiter 2, which implements a rate-of-change limitation (limitation of the first derivative) of filtered setpoint drive torque trqDesFlt. A limited setpoint torque trqDesLtd is obtained as output of rate-of-change limiter 2.

Rate-of-change limiter 2 implements the rate-of-change limitation by being supplied with a highest permitted value trqMAX and a lowest permitted value trqMIN for limited setpoint torque trqDesLtd. If filtered setpoint drive torque trqDesFlt transmitted to rate-of-change limiter 2 exceeds the highest permitted value trqMAX for limited setpoint torque trqDesLtd, or if it undershoots lowest permitted value trqMIN, then rate-of-change limiter 2 limits limited setpoint torque trqDesLtd output at the output to the highest permitted value trqMAX or to the lowest permitted value trqMIN for the limited setpoint torque.

Highest permitted value trqMAX or lowest permitted value trqMIN for limited setpoint torque trqDesLtd is ascertained with the aid of a characteristic map block 3, which determines a corresponding differential value trqDeltaLimit as a function of limited setpoint torque trqDesLtd [(k−1)T] calculated in the preceding sampling step (k−1), by which limited setpoint torque trqDesLtd(kT) calculated in the instantaneous sampling step (k) may deviate from limited setpoint torque trqDesLtd [(k−1)T] calculated in the preceding sampling step (k−1).

To this end, a delay element 4 is provided so as to delay instantaneous limited setpoint torque trqDesLtd(kT) by one sampling step, so that trqDesLtd [(k−1)T] calculated in the preceding sampling step (k−1) is provided at its output during the instantaneous sampling step (k). That is to say, values that were calculated in a previous sampling step (k−1) and then stored are used in order to calculate values that are valid for the instantaneous, $k^{th}$ sampling step. The rate-of-change limitation is implemented in that limited setpoint torque trqDesLtd(kT) determined in the instantaneous sampling step may deviate from trqDesLtd [(k−1)T] valid in the previous sampling step only by differential value trqDeltaLimit. (T: sampling period duration, time between two sampling steps).

The values for the highest permitted value trqMAX or the lowest permitted value trqMIN for limited setpoint torque trqDesLtd(kT) are ascertained in adders 5, one of adders 5 being supplied with the differential value using a changed algebraic sign (algebraic sign changer 6), thereby defining a range about limited setpoint torque trqDesLtd [(k−1)T], which results from the values of limited setpoint torque trqDesLtd[(k−1)T] increased and reduced by differential value trqDeltaLimit. Differential value trqDeltaLimit is always greater than zero.

The following holds for variables trqMAX and trqMIN:

$$trq\mathrm{MAX}(kT)=trqDesLtd[(k-1)T]+trq\mathrm{DeltaLimit}(kT) \quad (1)$$

$$trq\mathrm{MIN}(kT)=trqDesLtd[(k-1)T]-trq\mathrm{DeltaLimit}(kT) \quad (2)$$

and with $$trqDesLtd(kT)=\mathrm{MIN}[trq\mathrm{MAX}(kT),\mathrm{MAX}[trqDesFlt(kT),trq\mathrm{MIN}(kT)]] \quad (3)$$

therefore for limited setpoint torque trqDesLtd(kT):

$$trqDesLtd[(k-1)T]-trqDelta\mathrm{Limit}(kT)\leq trqDesLtd(kT)\leq trqDesLtd[(k-1)T]+trq\mathrm{DeltaLimit}(kT) \quad (4)$$

Figure 2:
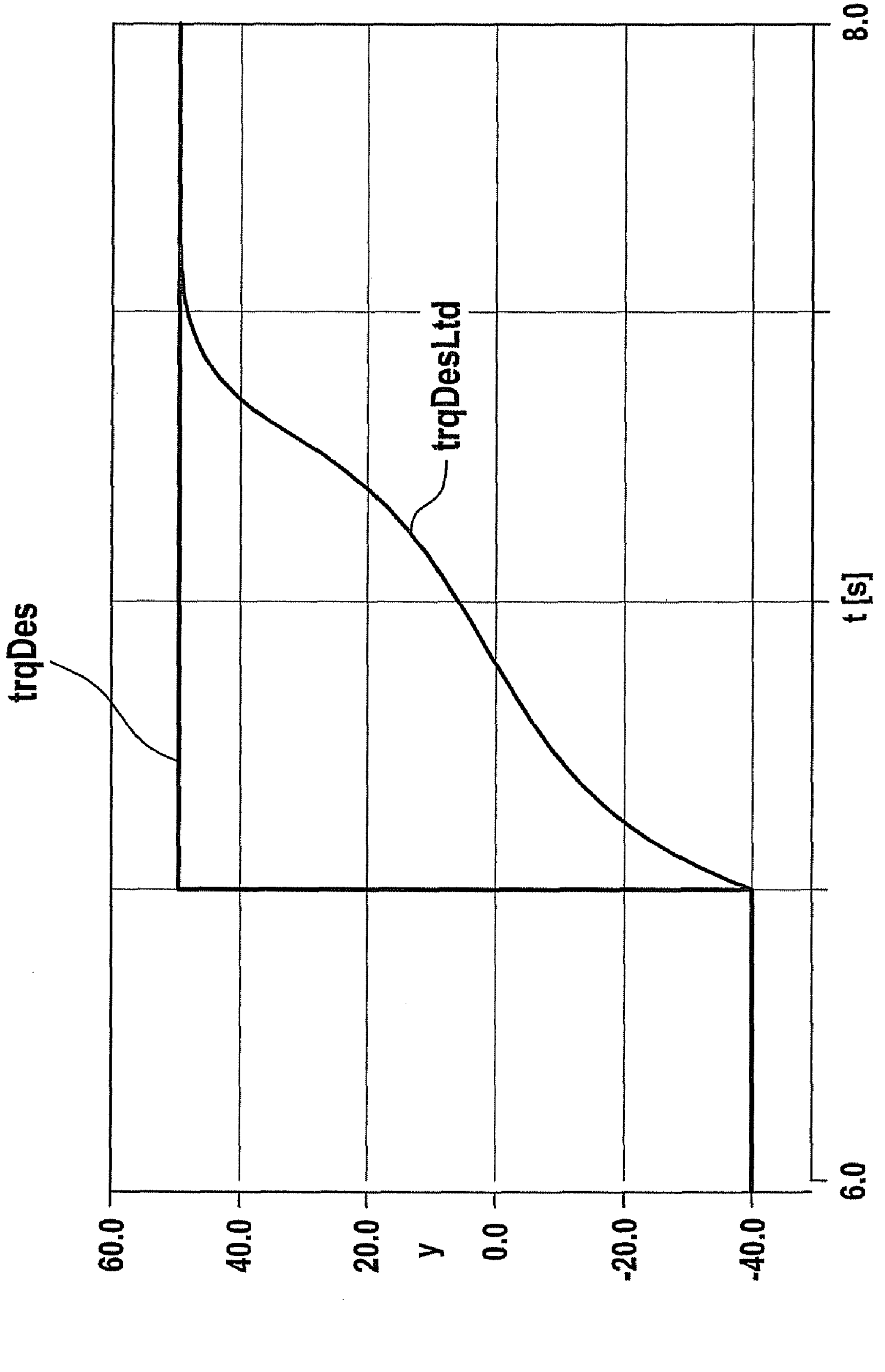
FIG. 2 shows a diagram illustrating simulation results of the setpoint torque curve following the torque formation according to FIG. 1.

Differential value trqDeltaLimit is specified in characteristic map block 3 as a function of the level of limited setpoint torque trqDesLtd according to a function or a characteristic map stored there, and it defines the zero crossing region in which the rate-of-change limitation is to be implemented. Thus, it is possible to limit the gradient of limited setpoint torque trqDesLtd more heavily in the region of the zero crossing, for example. In the most basic case, the characteristic map may define the zero crossing region by an appropriate threshold value, which indicates an amount of limited setpoint torque trqDesLtd below which the gradient of limited setpoint torque trqDesLtd is limited to a specific value. In the case of an amount of limited setpoint torque trqDesLtd above this threshold value, no limitation or a greater value for limiting the gradient of limited setpoint torque trqDesLtd is provided. The transition defined by the threshold value may also be made fluid with the aid of the characteristic map. FIG. 2 shows an exemplary simulation result for a jump in setpoint drive torque trqDes. The rate-of-change limitation of limited setpoint torque trqDesLtd during its zero crossing (transition from trailing throttle to acceleration operation) is clearly visible as is the low-pass-filtered approximation to setpoint drive torque trqDes at the end of the transition.

Figure 3:
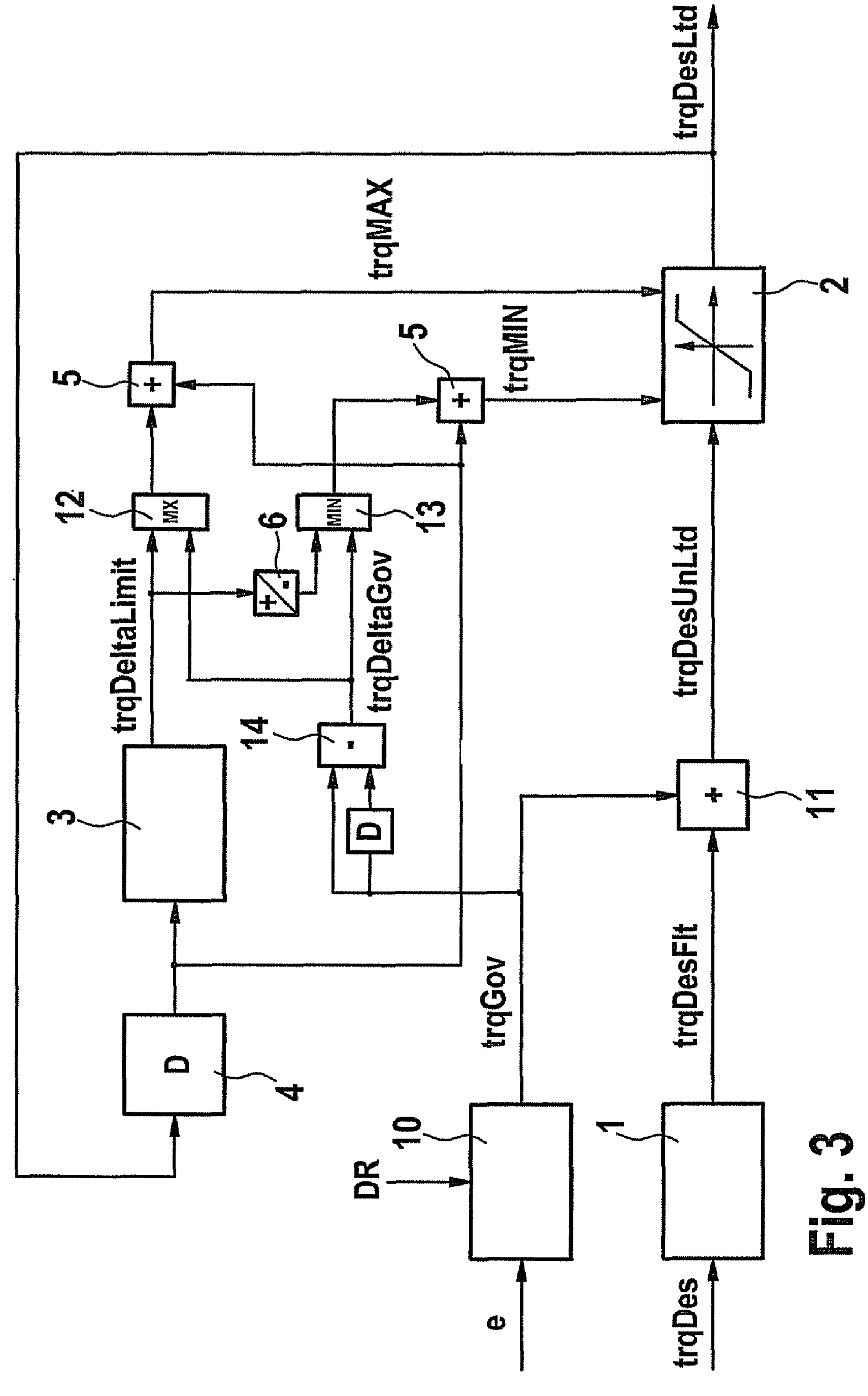
FIG. 3 shows a block diagram illustrating a method for realizing a torque formation according to an example implementation of the present invention.

FIG. 3 shows an exemplary embodiment of the present invention in which elements having the same or comparable function have been provided with matching reference numerals.

Setpoint drive torque trqDes is low-pass-filtered in filter stage 1, which results in filtered setpoint drive torque trqDesFlt. The addition of setpoint torque trqGov of a speed governor 10 in a torque adder 11 results in unlimited cumulative setpoint torque trqDesUnLtd. Speed governor 10 receives a system deviation e, which results from the difference between an actual speed and a setpoint speed. Speed governor 10 is activatable by a control signal DR, which indicates whether or not speed governor 10 is to be active. With an inactive speed governor 10, supplied setpoint torque trqGov is equal to zero and becomes greater than zero if the speed governor is active. Speed governor 10 is activated via control signal DR, in particular when the actual speed is close to the idling speed, i.e., at a rotational speed that corresponds to idling speed plus a threshold speed (approx. 10-50% of the idling speed). If speed governor 10 is inactive, then torque-controlled operation exists.

Adding controller setpoint torque trqGov to the output variable of filter stage 1 prevents a delay or a dynamic modification of trqGov by filter stage 1.

Unlimited cumulative torque trqDesUnLtd is then forwarded to a rate-of-change limiter 2, which implements a rate-of-change limitation (limitation of the first derivative) of unlimited cumulative torque trqDesUnLtd. A (gradient-limited) limited setpoint torque trqDesLtd is obtained as output of rate-of-change limiter 2.

In subtracter 14, difference trqDeltaGov of controller setpoint torque trqGov between instantaneous k and preceding sampling step k−1 is determined:

$$trq\mathrm{Delta}Gov(kT)=trqGov(kT)-trqGov[(k-1)\mathrm{T}],$$

by which the gradient of trqGov is described.

The difference trqDeltaGov is forwarded to a MAX element 12 and a MIN element 13 in order to execute a MAX function or a MIN function there. MAX element 12 is supplied with differential value trqDeltaLimit from characteristic map block 3, and MIN element 13 is supplied with differential value trqDeltaLimit inverted in algebraic sign switcher 6. Thus, difference trqDeltaGov is taken into account in the rate-of-change limitation of unlimited cumulative setpoint torque trqDesUnLtd.

With intermediate variables trqMAX and trqMIN, $$trq\mathrm{MAX}(kT)=trqDesLtd[(k-1)T]+\mathrm{MAX}[trq\mathrm{DeltaLimit}(kT),trq\mathrm{Delta}Gov(kT)] \tag{5}$$

$$trq\mathrm{MIN}(kT)=trqDesLtd[(k-1)T]+\mathrm{MIN}[-trq\mathrm{DeltaLimit}(kT),trq\mathrm{Delta}Gov(kT)] \tag{6}$$

the following applies:

$$trqDesLtd(kT)=\mathrm{MIN}[trq\mathrm{MAX}(kT),\mathrm{MAX}[trqDesUnLtd(kT),trq\mathrm{MIN}(kT)]] \tag{7}$$

Therefore, limited setpoint torque trqDesLtd lies between the limits $$trqDesLtd[(k-1)T]+\mathrm{MIN}[-trq\mathrm{DeltaLimit}(kT),trq\mathrm{Delta}Gov(kT)]\leqq trqDesLtd(kT)\leqq trqDesLtd[(k-1)T]+\mathrm{MAX}[-trq\mathrm{DeltaLimit}(kT),trq\mathrm{Delta}Gov(kT)] \tag{8}$$

and thus is gradient-limited. Differential value trqDeltaLimit is always greater than zero.

The MIN or MAX condition in equations (5) and (6) ensures that a change of controller setpoint torque trqGov that is greater than the rate-of-change limitation defined by the characteristic map block is able to act directly on limited setpoint torque trqDesLtd to be set. A reaction of controller setpoint torque trqGov to faults so as to prevent choking of the combustion engine, for example, is thus transmitted to limited setpoint torque trqDesLtd without delay and without limitation, in that the rate-of-change limitation is broadened appropriately for the intervention of the speed governor if change trqDeltaGov of the controller setpoint torque trqGov exceeds the stipulation of differential value trqDeltaLimit.

With active rate-of-change limitation trqDesLtd(kT)≠trqDesUnLtd(kT), filter stage 1 is regularly adapted, preferably at the end of each sampling step, in such a way that the following applies to filtered setpoint drive torque trqDesLtd after the adaptation:

$$trqDesFlt(kT)=trqDesLtd(kT)-trqGov(kT).$$

The adaptation is implemented by setting the filter parameters and/or initializing filter stage 1, so that the response behavior, filter time constant and the like are adapted. This allows a continuously differentiable detaching of the rate-of-change limitation by the filtering.

As an alternative, given an active speed governor and active rate-of-change limitation, an adaptation and/or initialization of speed governor 10 (e.g., an integral-action component) is useful in some operating states, for example in order to more quickly reduce controller setpoint torque trqGov in the transition from closed loop speed control to torque-controlled operation. The adaptation of speed governor 10 may take place regularly, preferably at the end of each sampling step, so that the following applies to controller setpoint torque trqGov after the initialization:

$$trqDesFlt(kT)=trqDesLtd(\mathrm{kT})-trqGov(kT).$$

In the same way as with filter stage 1, control parameters of closed loop speed control are adapted according to the condition to be achieved above. A proportional, combined adaptation and/or combined initialization of filter stage 1 and speed governor 10 is possible as well.

In the exemplary embodiment it is assumed that gradient-limited, limited setpoint torque trqDesLtd is implemented by the combustion engine without delay. After deducting a load torque trqLoad (running resistances), the remaining torque leads to an acceleration or deceleration of the vehicle as a function of the total moment of inertia of the inert vehicle masses moved in a rotary and translatory manner.

Figure 4A:
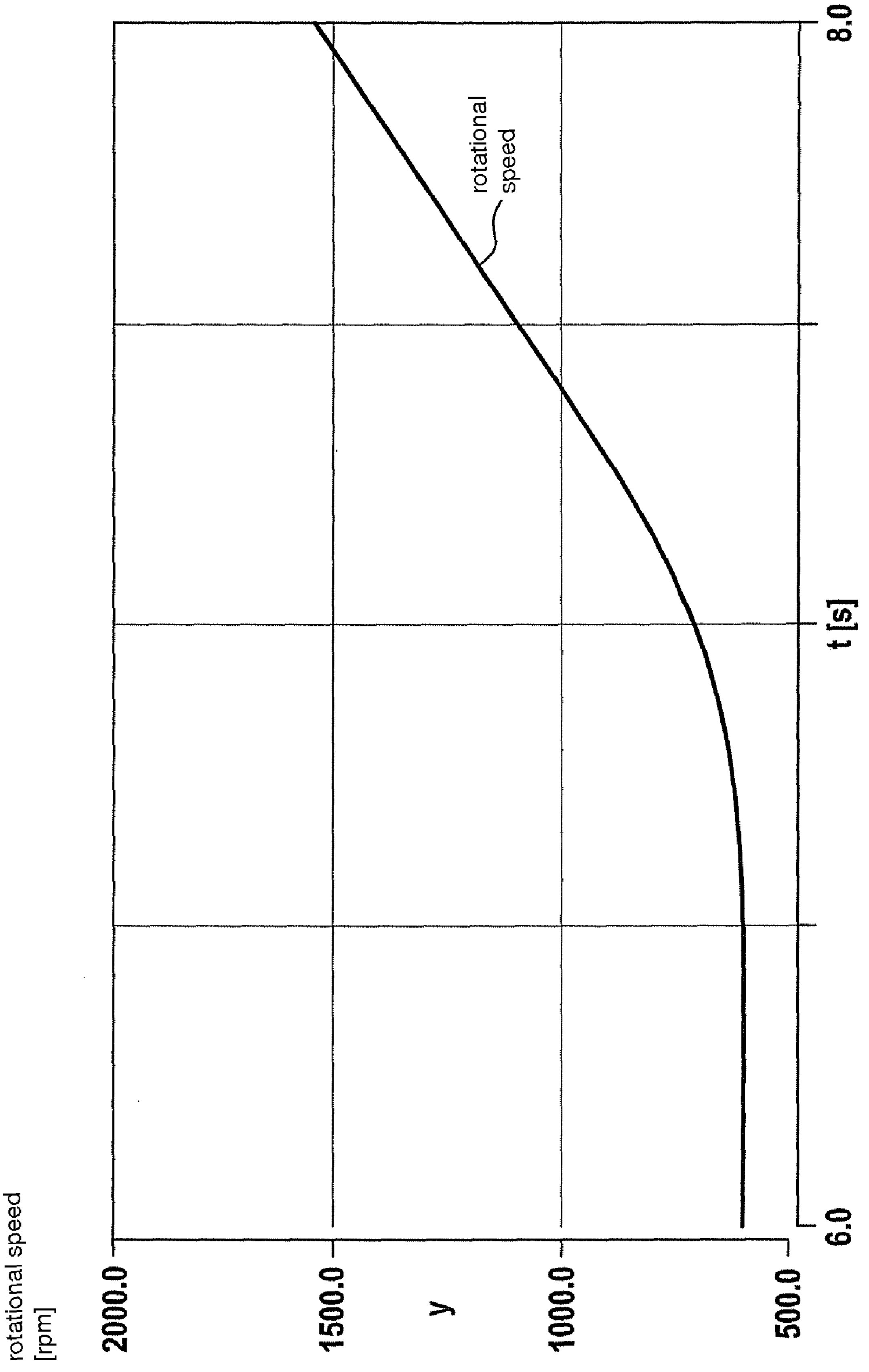
FIG. 4 shows a diagram illustrating simulation results of the setpoint torque curve according to the torque formation of FIG. 3.
Figure 4B:
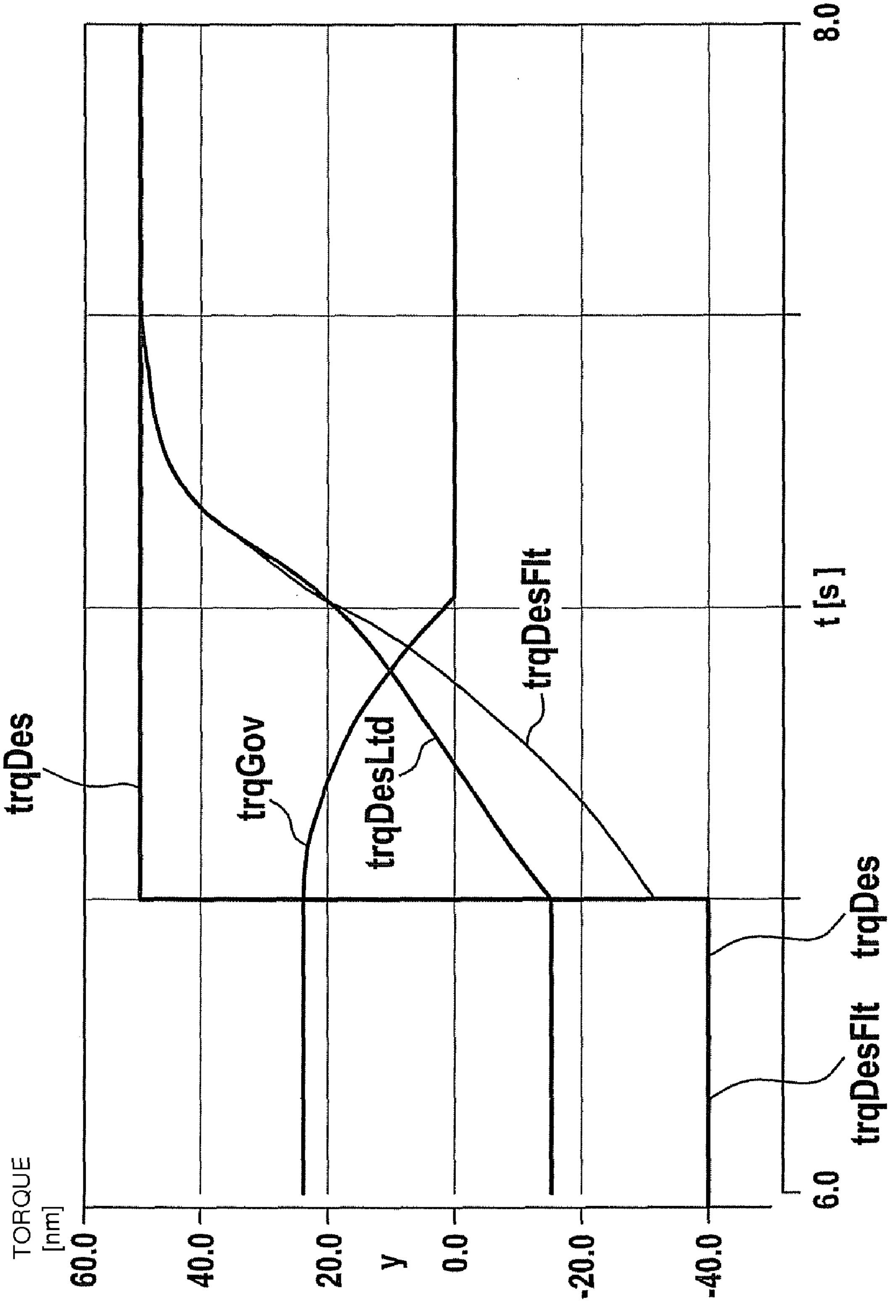

The diagrams of FIGS. 4*a* and 4*b* show simulation results for a transition between rpm-regulated operation close to idling speed and torque-controlled operation above idling speed. At the start of the simulation there is rpm-regulated operation; the driver does not actuate the driving pedal, and a negative setpoint drive torque trqDes=−40 Nm or trqDesFlt=−40 Nm results. The vehicle is moving with frictional engagement and at idling speed on a downhill grade. An assumed load torque of −15 Nm (driving resistances) has a propelling effect due to the gradient. In stationary operation, the remaining torque difference comes about at the controller by trqGov=25 Nm. In response to actuation of the driving pedal at instant t=6.5 s, setpoint drive torque trqDes shoots up to 50 Nm, filtered setpoint drive torque trqDesLtd follows at a delay, combined with an acceleration of the vehicle. The rise in rotational speed n leads to a reduction in controller setpoint torque trqGov, the difference trqDeltaGov being negative.

Limited setpoint torque trqDesLtd, which already includes the component of speed governor 10, rises in a gradient-limited manner. Due to the MAX condition in equation (5) and the negative difference trqDeltaGov, the rate-of-change limitation is defined solely by differential value trqDeltaLimit, which is determined in characteristic map block 3 and is adapted to the drive system. The rapid and drive-system-adapted rise of limited setpoint torque trqDesLtd leads to a high dynamic response with comfortable reactions to load changes. The characteristic of trqDeltaLimit, dependent upon trqDesLtd, is adapted to the specific drive system by appropriate populating.

If a fault occurs quickly (such as suddenly increased running resistance by driving against a curb), speed governor 10 is immediately able to set positive controller setpoint torques having high gradients and is thus able to prevent choking of the combustion engine. In this case the difference trqDeltaGov becomes positive; the rate-of-change limitation with respect to difference trqDeltaLimit is widened due to the MAX condition in the equation (5). The rising controller setpoint torque trqGov acts on limited setpoint torque trqDesLtd without limitation by rate-of-change limitation 2, which brings about a high control quality.

In the transition from rpm-regulated operation close to idling speed to torque-controlled operation above idling speed by rising setpoint drive torque (e.g., driver-desired torque) trqDes (by actuation of the driving pedal, for example), controller setpoint torque trqGov drops. The rate-of-change limitation of rising limited setpoint torque trqDesLtd is specified solely by characteristic map block 3. This results in high driving comfort. A corresponding behavior is produced in the transition from torque-controlled operation to rpm-regulated operation, e.g., when the drive pedal is released. Controller setpoint torque trqGov rises as a function of dropping rotational speed; the rate-of-change limitation, which forms dropping limited setpoint torque trqDesLtd, is specified solely by characteristic map block 3.

In contrast, if faults occur, then speed governor 10 is able to react very dynamically due to the direct effect on limited setpoint torque trqDesLtd, which is set by the combustion engine.

The method of the present invention may be realized both in a data-processing device suitably programmed (with the aid of hardware, firmware or software) and in a discretely configured form in which, in particular, the elements filter stage 1, closed-loop speed control 10, and rate-of-change limitation 2 are configured separately of one another.

The method according to the present invention is advantageously able to be used in hybrid vehicles in that limited setpoint torque trqDesLtd is understood as shared setpoint torque for all power units and is split among the power units such as a combustion engine and one or more electromachine(s) with the aid of a suitable method. The power units then jointly generate a gradient-limited torque, which is filtered for reasons of driving comfort, and they jointly implement the closed-loop speed control as well as the transitions between torque-controlled and rpm-regulated operation.

The method according to the present invention may advantageously be used in electric vehicles or motor vehicles having different types of engines.

What is claimed is:

1. A method for determining a gradient-limited setpoint torque from a requested setpoint drive torque and a controller setpoint torque of a closed-loop speed control, comprising:

limiting a gradient of an unlimited cumulative setpoint torque by a rate-of-change limitation in a region of the zero crossing of the gradient-limited setpoint torque to one of a maximally permitted or a minimally permitted value;

wherein the unlimited cumulative setpoint torque is a function of the requested setpoint drive torque and the controller setpoint torque; and wherein the one of the maximally permitted or the minimally permitted value of the rate-of-change limitation is a function of the controller setpoint torque of the closed-loop speed control.

2. The method as recited in claim 1, wherein the unlimited cumulative setpoint torque corresponds to the sum of the requested setpoint drive torque and the controller setpoint torque of the closed-loop speed control.

3. The method as recited in claim 2, wherein the one of the maximally permitted or the minimally permitted value of the rate-of-change limitation is determined from the limited setpoint torque and a differential value, and wherein the differential value is determined as a function of the limited setpoint torque using one of a rule or a characteristic map.

4. The method as recited in claim 3, wherein the one of the maximally permitted or the minimally permitted value of the rate-of-change limitation is determined one of cyclically or at specified time intervals, and wherein the one of the maximally permitted or the minimally permitted value of the rate-of-change limitation results from the limited setpoint torque directly determined in a preceding cycle and the differential value, and wherein the differential value is a function of the limited setpoint torque directly determined in the preceding cycle.

5. The method as recited in claim 3, wherein the one of the maximally permitted or the minimally permitted value of the rate-of-change limitation is set as a function of one of (a) a gradient of the controller setpoint torque of the closed-loop speed control or (b) a difference between an instantaneous controller setpoint torque and the controller setpoint torque determined in the preceding cycle, if one of the amount of the gradient of the controller setpoint torque of the closed-loop speed control or the amount of the difference between the instantaneous controller setpoint torque and the controller setpoint torque determined in the preceding cycle is greater than the amount of the differential value.

6. The method as recited in claim 3, wherein the requested setpoint drive torque is low-pass filtered prior to determining the unlimited cumulative setpoint torque.

7. The method as recited in claim 6, wherein at least one filter parameter of the low-pass filtering is configured such that the result of the filtering corresponds to the difference between the limited setpoint torque and the controller setpoint torque of the closed-loop speed control.

8. The method as recited in claim 6, wherein at least one parameter of the closed-loop speed control is adapted in such a way that the controller setpoint torque of the closed-loop speed control corresponds to the difference between the limited setpoint torque and the filtered setpoint drive torque.

9. The method as recited in claim 6, wherein the closed-loop speed control is activated as a function of a rotational speed of a drive motor.

10. A device for determining a gradient-limited setpoint torque from a requested setpoint drive torque and a controller setpoint torque of a closed-loop speed control, comprising:

a speed governor configured to supply the controller setpoint torque to the closed-loop speed control;

a rate-of-change limiter configured to limit the gradient of an unlimited cumulative setpoint torque in a region of the zero crossing of the gradient-limited setpoint torque to at least one of a maximally permitted and a minimally permitted value, wherein the unlimited cumulative setpoint torque is a function of the requested setpoint drive torque and the controller setpoint torque of the closed-loop speed control; and a calculation unit configured to supply the at least one of the maximally permitted and the minimally permitted value to the rate-of-change limitation as a function of the controller setpoint torque of the closed-loop speed control.

* * * * *